(12) United States Patent
Saxena et al.

(10) Patent No.: US 11,327,553 B2
(45) Date of Patent: *May 10, 2022

(54) DISTRIBUTED DIGITAL LOW-DROPOUT VOLTAGE MICRO REGULATOR

(71) Applicant: NVIDIA Corporation, Santa Clara, CA (US)

(72) Inventors: Siddharth Saxena, San Jose, CA (US); Tezaswi Raja, San Jose, CA (US); Fei Li, Campbell, CA (US); Wen Yueh, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/326,106

(22) Filed: May 20, 2021

(65) Prior Publication Data

US 2021/0271312 A1    Sep. 2, 2021

Related U.S. Application Data

(63) Continuation of application No. 15/996,334, filed on Jun. 1, 2018, now Pat. No. 11,048,321.

(51) Int. Cl.
*G09G 5/00* (2006.01)
*G06F 1/3287* (2019.01)
*G06F 1/3234* (2019.01)
*G06F 1/3296* (2019.01)

(52) U.S. Cl.
CPC .......... *G06F 1/3287* (2013.01); *G06F 1/3265* (2013.01); *G06F 1/3296* (2013.01)

(58) Field of Classification Search
CPC ........ G06F 1/28; G06F 1/3287; G06F 1/3296; G06F 1/3215; G06F 1/3293; G06F 1/3275; G06F 1/3243; G06F 1/324; G06F 1/3265; G09G 3/20; G09G 3/3696; G09G 2310/08; G09G 2330/021; G09G 2330/025; G05F 1/563; G05F 1/59
USPC ........................................................ 345/212
See application file for complete search history.

(56) References Cited

U.S. PATENT DOCUMENTS

| | | | |
|---|---|---|---|
| 2012/0119717 A1 | 5/2012 | Bose et al. | |
| 2014/0277812 A1 | 9/2014 | Shih et al. | |
| 2016/0118967 A1 * | 4/2016 | Krishnamurthy | H03L 7/0818 327/158 |
| 2016/0246342 A1 * | 8/2016 | Muthukaruppan | G05F 1/59 |
| 2017/0024000 A1 * | 1/2017 | Chen | G06F 1/3243 |
| 2018/0226981 A1 * | 8/2018 | Salem | H03M 1/462 |
| 2018/0329440 A1 * | 11/2018 | Jefremow | G05F 1/59 |

OTHER PUBLICATIONS

Non-Final Office Action from U.S. Appl. No. 17/115,614, dated Sep. 29, 2021.

* cited by examiner

*Primary Examiner* — Jennifer T Nguyen
(74) *Attorney, Agent, or Firm* — Zilka-Kotab, P.C.

(57) ABSTRACT

Digital low-dropout micro voltage regulator configured to accept an external voltage and produce a regulated voltage. All active devices of the voltage regulator are digital devices. All signals of the voltage regulator, except the first voltage and the regulated voltage, may be characterized as digital signals. Some active devices of the voltage regulator may be physically separated from other active devices of the voltage regulator by active devices of non-voltage regulator circuitry.

16 Claims, 7 Drawing Sheets

DISTRIBUTED DIGITAL LOW-DROPOUT VOLTAGE MICRO REGULATOR

CROSS-REFERENCE TO RELATED APPLICATIONS

This application is a continuation application of U.S. patent application Ser. No. 15/996,334, filed Jun. 1, 2018, which is hereby incorporated by reference in its entirety.

FIELD OF THE INVENTION

Embodiments in accordance with the present invention relate to the field of voltage supplies. More specifically, embodiments of the present invention relate to systems and methods for distributed digital low-dropout voltage micro regulators.

BACKGROUND

As a general trend, complex digital chips, e.g., graphics processing units (GPUs) and/or central processing units (CPUs), are being divided into an increasing number of power domains. A large number of power domains allows high granularity to turn off functional blocks that are not in use, and also allows operation of functional blocks at a minimal voltage required for a specific function. In addition, such a minimal voltage may change based on functional requirements. For example, the same functional block may operate at different voltages at different times, depending on a functional requirement, e.g., higher voltage to support a higher operating frequency, and lower voltage for a lower operating frequency. This is generally known as or referred to as "dynamic voltage and frequency scaling" (DVFS).

In the conventional art, a power supply for each different voltage domain is typically provided by separate chips for each required voltage and/or domain. Such power chips generally have associated analog components, e.g., inductors, capacitors, and/or precision resistors. Such external chips and components consume valuable PCB real estate and increase costs.

In addition, such external circuits measure and regulate the desired voltage at the external power chip. Due to distribution losses, the voltage actually delivered to the power domain on the main chip will be different than the measured and regulated voltage at the power supply chip, and the difference will vary based on the changing load of the power domain.

SUMMARY OF THE INVENTION

Therefore, what is needed are systems and methods for distributed digital low-dropout micro regulators. What is additionally needed are systems and methods for distributed digital low-dropout micro regulators that utilize digital ON/OFF control of power-gating header transistors. A further need is for systems and methods for distributed digital low-dropout micro regulators that measure a regulated voltage at its load. A still further need exists for systems and methods for distributed digital low-dropout micro regulators that are compatible and complementary with existing systems and methods of design and manufacture for complex digital integrated circuits. Embodiments of the present invention provide these advantages.

In accordance with a first embodiment of the present invention, an integrated circuit includes a voltage regulator. The voltage regulator is configured to accept an external voltage and produce a regulated voltage. All active devices of the voltage regulator are either digital logic gates or digitally-controlled power gating header transistors. All signals of the voltage regulator, except the first, supply, voltage and the regulated voltage, may be characterized as digital signals. Some active devices of the voltage regulator may be physically separated from other active devices of the voltage regulator by active devices of non-voltage regulator circuitry.

In accordance with another embodiment of the present invention, an integrated circuit includes a first power domain. The first power domain includes first digital logic operating at a first voltage, and a first voltage regulator for regulating the first voltage. The first voltage regulator includes a first voltage sensor for sensing a voltage output of the first voltage regulator measured at the first digital logic, and a first plurality of digitally-controlled power-gating header transistors for switching a voltage external to the first power domain to regulate the first voltage. The first plurality of power-gating header transistors are digitally controlled. For example, a voltage applied to a gate of a MOS power-gating header transistor controls the power-gating header MOS transistor to be either fully "on" or fully "off."

The integrated circuit also includes a second power domain. The second power domain includes second digital logic operating at a second voltage, and a second voltage regulator for regulating the second voltage. The second voltage regulator includes a second voltage sensor for sensing a voltage output of the second voltage regulator measured at the second digital logic, and a second plurality of digitally-controlled power-gating header transistors for switching a voltage external to the second power domain to regulate the second voltage. The second plurality of power-gating header transistors are digitally controlled.

In accordance with a further embodiment of the present invention, a graphics processing unit (GPU) integrated circuit includes at least two power domains configured to operate at different voltages. Each of the power domains includes a streaming multiprocessor, and a voltage regulator for regulating an operating voltage of the streaming multiprocessor. The voltage regulator includes a voltage sensor for sensing operating voltage measured at the streaming multiprocessor, and a plurality of digitally-controlled power-gating header transistors for switching a voltage external to the first power domain to regulate the operating voltage.

In accordance with a method embodiment of the present invention, a voltage request signal is received at a voltage regulator. The voltage request signal informs the voltage regulator of a desired regulation voltage. The voltage regulator measures a local regulated voltage at a load. The local voltage may be measured by a voltage sensor. The measured voltage is compared to the requested voltage. The comparison may be performed in the digital domain, in accordance with embodiments of the present invention. A difference between the actual local regulated voltage and the requested voltage is used by a proportional, integral and derivative (PID) controller to modulate the strength (or resistance) of the power headers. This is achieved by adjusting the percentage of power headers which need to be ON, and also by applying a pulse width modulation signal to some of those power headers in order to have a fine-grained control on the strength of the power gates. The ON/OFF and pulse width modulation signals are applied to a plurality of power-gating header transistors. Hence, the power gating header transistors are digitally controlled.

Responsive to the ON/OFF and pulse width modulation signals, the plurality of power-gating header transistors switch an externally provided voltage to produce a local regulated voltage. In addition, there is an additional bank of power headers which is typically OFF and only turned ON for brief periods of time when there is a sudden change in load current demand in order to minimize a worst-case voltage droop. This is achieved through a rapid response control loop working alongside the aforementioned PID controller.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings are not drawn to scale.

DETAILED DESCRIPTION

Figure 1:
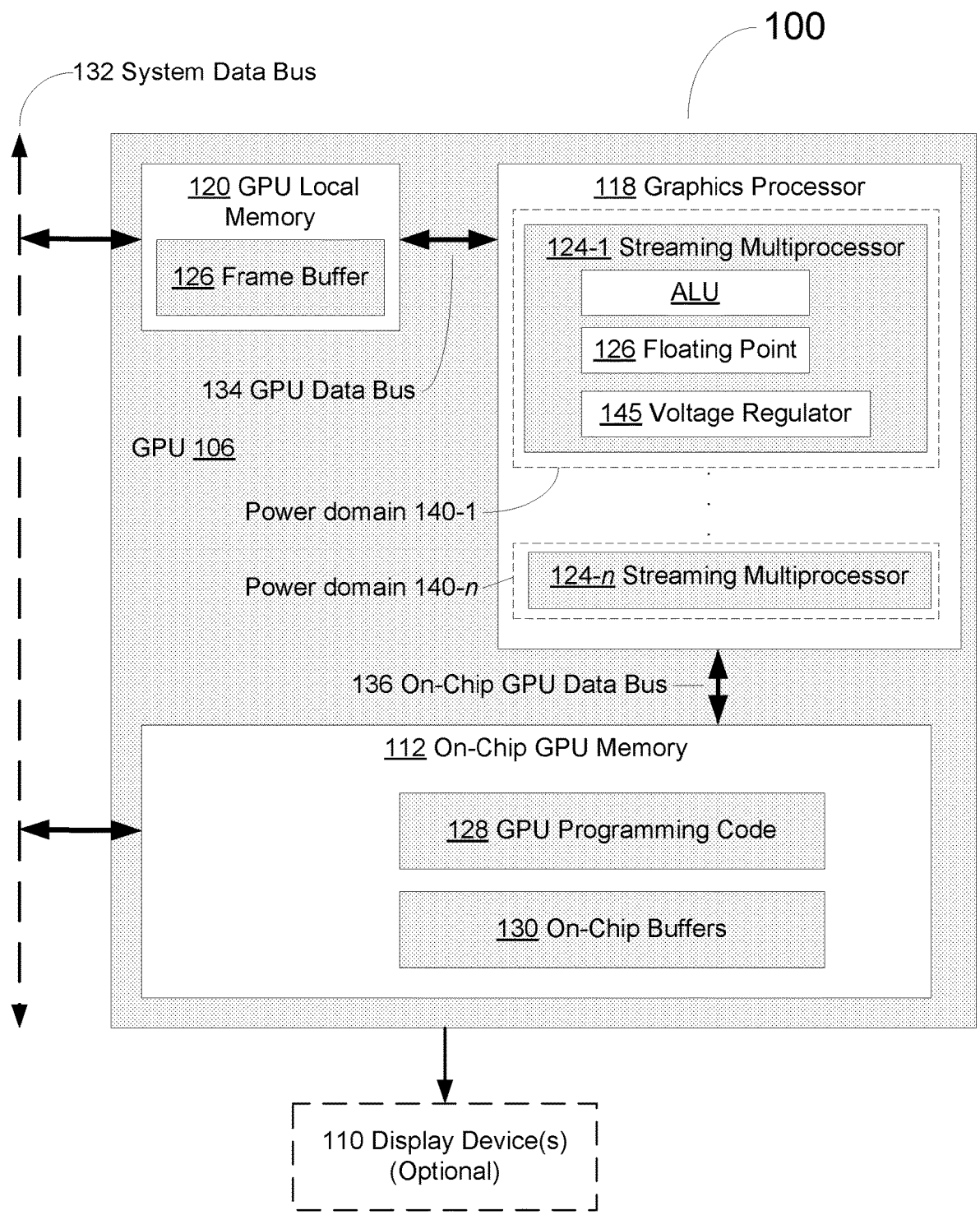
FIG. 1 illustrates an exemplary block diagram of an exemplary electronic system, which may be used as a platform to implement embodiments of the present invention.

Reference will now be made in detail to various embodiments of the present invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, circuits, and modules have not been described in detail as not to unnecessarily obscure aspects of the invention.

Notation and Nomenclature

Some portions of the detailed descriptions which follow (e.g., method 700) are presented in terms of procedures, steps, logic blocks, processing, and other symbolic representations of operations on data bits that may be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, data, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "looking up" or "performing" or "analyzing" or "generating" or "resolving" or "accepting" or "selecting" or "determining" or "displaying" or "presenting" or "computing" or "sending" or "receiving" or "reducing" or "detecting" or "setting" or "placing" or "testing" or "forming" or "mounting" or "removing" or "ceasing" or "stopping" or "coating" or "processing" or "generating" or "adjusting" or "creating" or "executing" or "continuing" or "indexing" or "translating" or "calculating" or "measuring" or "gathering" or "running" or the like, refer to the action and processes of, or under the control of, a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Distributed Digital Low-Dropout Voltage Microregulator

FIG. 1 illustrates a block diagram of an exemplary electronic system 100, which may be used as a platform to implement embodiments of the present invention. In the present example, electronic system 100 comprises a graphics processing unit (GPU) 106 implemented on a single integrated circuit. It is to be appreciated that embodiments in accordance with the present invention are well suited to other types of integrated circuits, and electronic systems comprising multiple integrated circuits.

The electronic system 100 includes an optional system data bus 132, external to the GPU 106, a graphics processing unit (GPU) 106, and optional display device(s) 110. In alternate embodiments, the CPU 102, portions of the graphics processing subsystem 106, the system data bus 132, or any combination thereof, may be integrated into a single processing unit. Further, the functionality of the graphics processing subsystem 106 may be included in a chipset or in some other type of special purpose processing unit or co-processor.

The graphics processing system 106 includes a GPU 118, an on-chip GPU memory 122, an on-chip GPU data bus 136, a GPU local memory 120, and a GPU data bus 134. The GPU 118 is configured to communicate with the on-chip GPU memory 122 via the on-chip GPU data bus 136 and with the GPU local memory 120 via the GPU data bus 134. The GPU 118 may receive instructions transmitted by the CPU 102, process the instructions in order to render graphics data and images, and store these images in the GPU local memory 120. Subsequently, the GPU 118 may display certain graphics images stored in the GPU local memory 120 on the display devices 110.

The GPU 118 includes one or more streaming multiprocessors 124, e.g., streaming multiprocessors 124-1 to 124-n. Each of the streaming multiprocessors 124 is capable of executing a relatively large number of threads concurrently. Advantageously, each of the streaming multiprocessors 124 can be programmed to execute processing tasks relating to a wide variety of applications, including but not limited to linear and nonlinear data transforms, filtering of video and/or audio data, modeling operations (e.g., applying of physics to determine position, velocity, and other attributes of objects), and so on. Of the processing tasks, floating-point processing is allocated to a FPU and integer processing is allocated to an arithmetic logic unit (ALU). The GPU 118 may be provided with any amount of on-chip GPU memory 122 and GPU local memory 120, including none, and may use on-chip GPU memory 122, GPU local memory 120, and system memory 104 in any combination for memory operations.

The on-chip GPU memory 122 is configured to include GPU programming code 128 and on-chip buffers 130. The GPU programming 128 may be transmitted from the GPU driver 116 to the on-chip GPU memory 122 via the system data bus 132.

The GPU local memory 120 typically includes less expensive off-chip dynamic random access memory (DRAM) and is also used to store data and programming used by the GPU 118. As shown, the GPU local memory 120 includes a frame buffer 126. The frame buffer 126 stores data for at least one two-dimensional surface that may be used to drive the display devices 110. Furthermore, the frame buffer 126 may include more than one two-dimensional surface so that the GPU 118 can render to one two-dimensional surface while a second two-dimensional surface is used to drive the display devices 110.

The optional display device(s) 110 are one or more output devices capable of emitting a visual image corresponding to an input data signal. For example, a display device may be built using a cathode ray tube (CRT) monitor, a liquid crystal display (LCD), or any other suitable display system. The input data signals to the display devices 110 are typically generated by scanning out the contents of one or more frames of image data that is stored in the frame buffer 126.

Integrated circuit 100 may be divided into a variety of power domains 140-1 to 140-m. For example, each streaming multiprocessor 124-1 to 124-n may be part of a separate independent power domain 140-1 to 140-n. Each power domain 140-1 to 140-m includes its own voltage regulator 145. Other portions of the integrated circuit 100 may also form, or be a part of, independent power domains, e.g., separate from the domains of the streaming multiprocessors. It is appreciated that the number of independent power domains may not equal the number of streaming multiprocessors, e.g., m is not necessarily equal to n. Such power domains enable the circuitry within such power domains to operate at a minimal voltage necessary for their required functionality, e.g., corresponding to an operating frequency required for a specific function, and/or to be supplied with no voltage, e.g., when no function is required.

For example, if streaming multiprocessor 124-1 is assigned a task that requires a maximum level of processing, it may be controlled to operate at a maximum operating frequency requiring a maximum operating voltage. Meanwhile, streaming multiprocessor 124-2 may be assigned a different task, requiring a lesser, but non-zero, level of processing. Accordingly, multiprocessor 124-2 may be controlled to operate at a lesser operating frequency requiring a lesser operating voltage. Further, streaming multiprocessor 124-3 may not be required to perform any tasks, and may be controlled not to operate, e.g., have zero operating frequency. In such a case, streaming multiprocessor 124-3 may be supplied a zero voltage, so as to not consume any power, including idle leakage power.

It is appreciated that operating frequency of an integrated circuit, or portion thereof, may be a function of operating temperature. Embodiments in accordance with the present invention may be utilized to adjust voltage in response to temperature effects. It is further appreciated that a voltage-frequency characteristic of an integrated circuit, or portion thereof, may vary due to manufacturing variance. Embodiments in accordance with the present invention may be utilized to adjust voltage, including a body biasing voltage applied to a body terminal of FETs, to correct and/or control for such variations. Body biasing voltages may also be advantageously adjusted to reduce static leakage.

Figure 2:
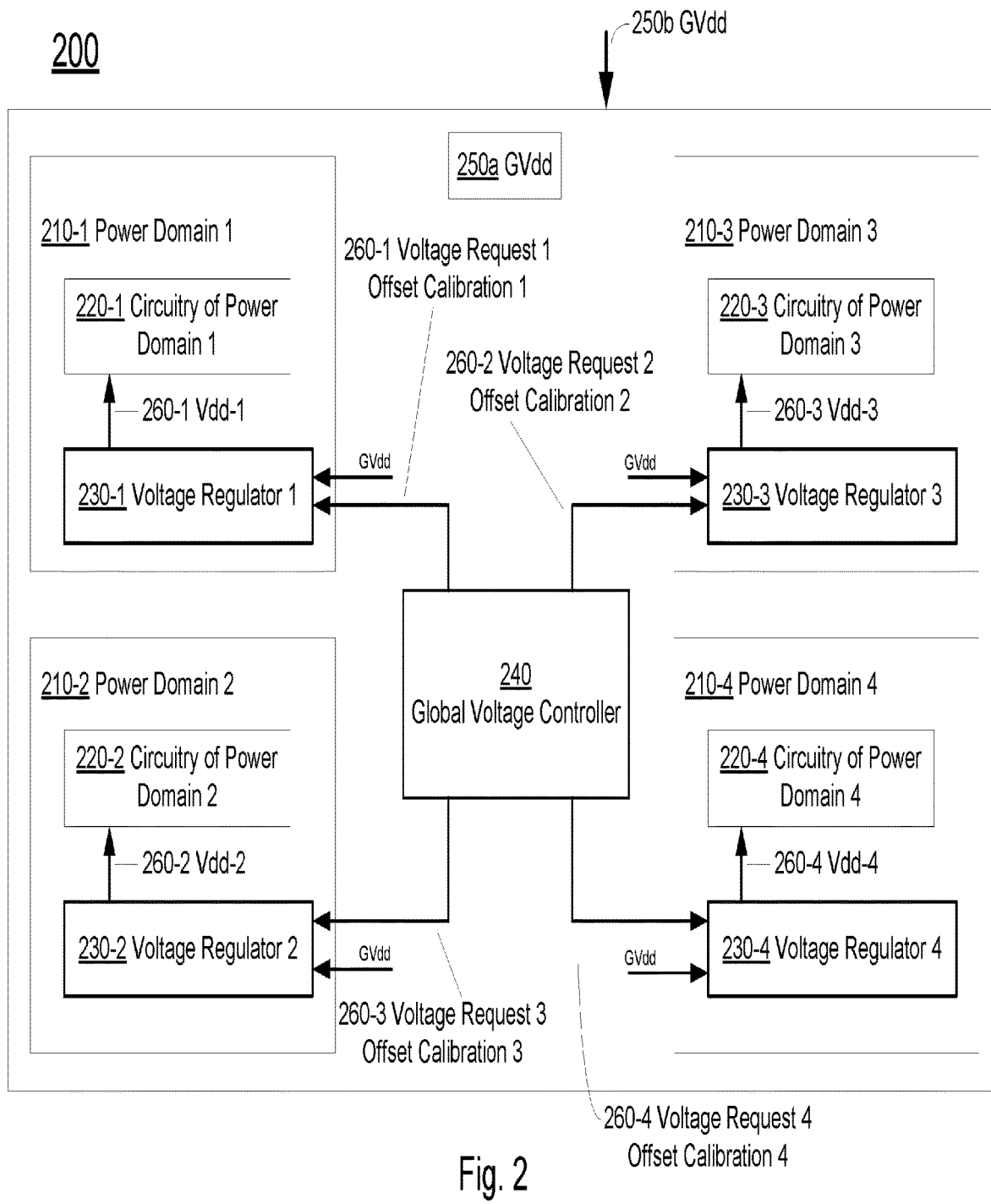
FIG. 2 illustrates an exemplary integrated circuit, in accordance with embodiments of the present invention.

FIG. 2 illustrates an exemplary integrated circuit 200, in accordance with embodiments of the present invention. Exemplary integrated circuit 200 comprises four power domains 210-1 to 210-4. Each power domain 210-1 to 210-4 comprises a voltage regulator 230-1 to 230-4. Voltage regulators 230-1 to 230-4 provide a regulated operating voltage 260-1 to 260-4 to circuitry 220-1 to 220-4 of each power domain 210-1 to 210-4.

A global voltage controller 240 determines the operating voltage for each power domain 210-1 to 210-4. It is appreciated that the operating voltage for each power domain 210-1 to 210-4 may be different, e.g., according to an assigned operating frequency for each such power domain. Global voltage controller 240 provides two signals, voltage request and offset calibration signals 260-1 to 260-4 to each power domain 210-1 to 210-4. The voltage request and offset calibration signals 260-1 to 260-4 are utilized by the voltage regulators 230-1 to 230-4 to produce the desired voltage, as determined by global voltage controller 240. A global voltage GVDD is supplied to each voltage regulator 230-1 to 230-4. The global voltage GVDD may be provided from an off-chip source, e.g., GVDD 250b, and/or an on-chip voltage supply, GVDD 250a.

Figure 3:
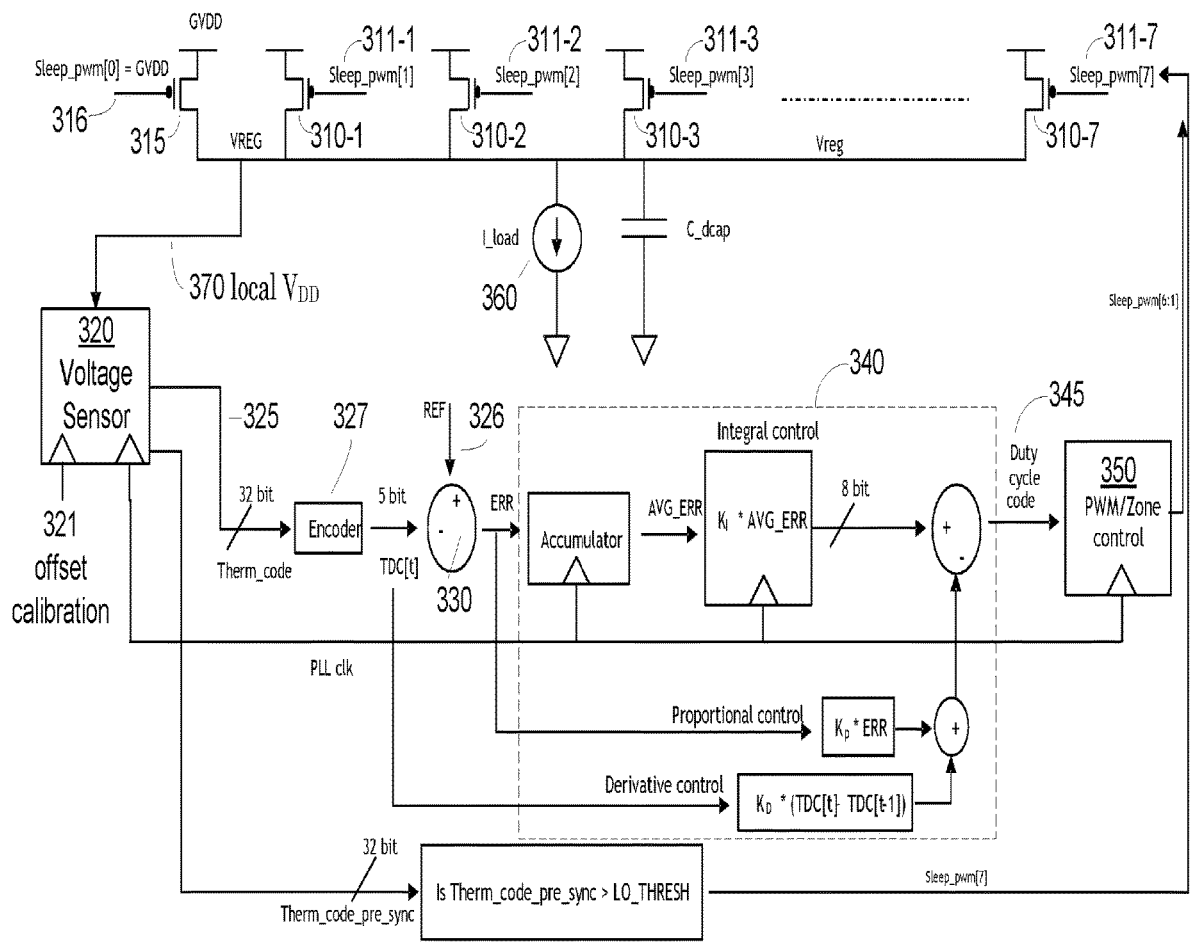
FIG. 3 illustrates a schematic of an exemplary distributed digital low-dropout voltage micro regulator system, in accordance with embodiments of the present invention.

FIG. 3 illustrates a schematic of an exemplary distributed digital low-dropout voltage micro regulator system 300, in accordance with embodiments of the present invention. Voltage regulator system 300 exists within a power domain, for example, as voltage regulator 230-1 within power domain 1210-1 of FIG. 2, and provides power, e.g., a regulated voltage, to circuitry within such power domain, for example, circuitry of power domain 1220-1 (FIG. 2).

Voltage regulator system 300 comprises a plurality of banks of digitally-controlled power gating header transistors. In the exemplary embodiment of FIG. 3, eight such banks, bank 315, and banks 310-1 through 310-7, are illustrated. Embodiments in accordance with the present invention are well suited to other numbers of banks. All such banks of digitally-controlled power gating header transistors comprise a plurality of digitally-controlled power gating header transistors, for example, hundreds to thousands of individual digitally-controlled power gating header transistors in each bank. In general, the individual digitally-controlled power gating header transistors may have a very small current switching capability. All header transistors in a bank are controlled by the same signal, e.g., Sleep_pwm [7:1] 311-1 to 311-7, such that in aggregate, the devices in a bank function to switch a much larger current.

In general, the number of digitally-controlled power gating header transistors in each bank will vary. In accordance with embodiments of the present invention, the current-switching capacity of the banks of power gating header transistors may have a binary relationship. For example, bank 310-1 may have twice the current-switching capacity, e.g., twice the number of transistors, of bank 310-2, and bank 310-2 may have twice the current-switching capacity of bank 310-3, etc.

In accordance with other embodiments of the present invention, the current-switching capacity of each of the banks of power gating header transistors may be about the same. For example, exemplary banks 310-1 to 310-6 may each have substantially the same number and type of power gating header transistors, and be configured to switch about the same amount of current. In some embodiments, each of exemplary banks, 310-1 to 310-6, may comprise about 1% to 2.5% of the total number of power gating header transistors.

Voltage regulator system 300 receives a global voltage GVDD 305, for example, from an off-chip voltage regulator. GVDD 305 may be, for example, an unchanging "system" voltage, although that is not required. The global voltage GVDD 305 is gated by a first plurality of digitally-controlled power-gating header transistors 315 and a second plurality of digitally-controlled power-gating header transistors 310-1 to 310-7. In contrast to the conventional art that may utilize analog control of power devices, e.g., a continuously varying analog biasing voltage is applied to a gate of a power FET in a power header role, the power-gating header transistors 315 and 310-1 to 310-7 of the present invention are digitally controlled. For example, a voltage applied to gates of a MOS power-gating header transistors 315 controls the power-gating header MOS transistor to be either fully "on" or fully "off."

It is to be appreciated that traditional linear voltage regulators are typically not considered to be "low drop out." For example, such conventional art regulators may use an input voltage of 1.8 v and drop it down by about 1 volt to create a regulated voltage of 0.8 v. The analog FETs used in such conventional art voltage regulators are typically thick-oxide transistors, which are different from the standard FETs used in digital logic gates. As an unfortunate consequence, such thick oxide analog FETs need to be placed in a specially segregated area of a die where they all can be placed, and subjected to a thick-oxide process. This is mainly due to design rules for manufacturability.

In accordance with embodiments of the present invention, the use of digital devices for voltage regulation enables voltage regulation directly within the power-consuming digital logic. For example, analog power transistors typically cannot be located within digital logic; rather such analog transistors must typically be segregated from digital circuitry. For example, distribution of an analog bias voltage across a large die is a challenge due to resistive losses. Consequently, traditional practice is generally to group analog FETs together in one place. In addition, analog FETs are often thick-oxide devices, designed to switch higher voltages, e.g., 1.8 volts, in comparison to standard digital logic transistors, that are designed to operate on lower voltages, e.g., <1.0 volts. Hence, due to design rules, it is usually necessary to separate the thick-oxide, analog FETs from thinner-oxide digital logic transistors. Further, an analog FET requiring a 1.8 volt supply is typically constrained to be located near package I/O pads, which may typically be relatively far away from high density digital circuitry. Placing the digitally-controlled power-gating header transistors 315 and 310 within the load of digital logic circuits has numerous advantages, including voltage measurement closer to the load, which may improve regulation, and minimizing distribution losses, in comparison to the conventional art.

The digitally-controlled power-gating header transistors 315 and 310 may be laid out with minimal feature width. In addition, in some embodiments, the digital power-gating header transistors 315 and 310 may be distributed, e.g., interleaved, throughout the functional circuitry of a power domain. "Interleaved" and/or "distributed" refer to integrated circuit physical layouts in which the digital power-gating header transistors 315 and 310 are interspersed within digital circuit blocks. For example, digital circuit elements may occur between instances of power-gating header transistors 315. This ensures that regulated power supply distribution is uniformly spread over the entire digital circuitry operating on the regulated voltage.

Such an interleaved and/or distributed layout may beneficially create a more even voltage level throughout the power domain, and may further decrease IR conduction losses between the power-gating header transistors 315 and 310 and the load, in accordance with embodiments of the present invention. The PWM signal which controls the distributed power gating header transistors itself has to be distributed to each individual power gate. This results in a beneficial natural phase shift in the PWM signal received across all power gates, which advantageously reduces the chance of all power gates turning ON and OFF at the same time. This advantageously reduces the ripple on the regulated voltage supply, e.g., local VDD 370.

The digital devices of the first and second pluralities 315 and 310 are generally small devices, e.g., the smallest possible devices for a given manufacturing process node, and are not designed or intended to pass large currents. There may be hundreds to thousands of devices in the first and second pluralities 315 and 310. The number of devices, and the percentage of devices assigned to each back 315 and 310-1 through 310-7 is a function of current capacity of the gates, the power requirements of the load circuitry, including the variation of power requirements, range of voltage adjustment, on-resistance of the gates, e.g., RDS, current capacity of vias, e.g., from metal to device sources, ripple, and the like. Exemplary values for the percentage of devices in the second plurality 310 (represented as x), may range from 10-15%, in some embodiments.

In accordance with embodiments of the present invention, the multiple banks of power power-gating header transistors 315 and 310-1 through 310-7 may operate accordingly to different control rules. As further described below, power-gating header transistors 310-6 to 310-1 are modulated, as individual banks, accordingly to the signals Sleep_pwm[6:1], 311-6 to 311-1, to achieve various levels of current conductance, so as to control the local VDD 370. For example, a pulse-width modulation (PWM) signal(s) is applied to one or more banks of power-gating header transistors such that the power-gating header transistors, over a short time interval, conduct some current, but conduct less current than if all of the power-gating header transistors in the bank were on for the entire time interval.

In the exemplary embodiment of FIG. 3, signal Sleep_pwm[0]316 generally operates as an enable signal power-gating header transistors 315. For example, power-gating header transistors 315 are generally either on or off accordingly to signal Sleep_pwm[0] 316, and are not modulated to achieve an intermediate level of current conductance. Sleep_pwm[0] is typically configured to turn OFF the power-gating header transistors 315 when the requested voltage of regulation is very low, since the current conductance requirement will be very low for a low voltage operation. As will be described further below, power-gating header transistor bank 310-7 is used to respond to fast transients, and operates under a different control loop than power power-gating header transistors 315 and 310-1 through 310-6.

The first plurality of digital power-gating header transistors 315 is controlled by an enable signal Sleep_pwm[0] 316 which is configured to turn OFF the (100-x) % of the power-gating header transistors as explained before, while the second group of digital power-gating header transistors 310 is controlled by a plurality of pulse-width modulation (PWM) signals 311-1 through 311-6. In contrast to some conventional art systems, PWM signals 311-1 through 311-6 are digital signals. PWM signals to the different banks can assume different waveforms at the same time. For example, Power-gating header transistors 310-1 could be fully OFF, power gating header transistors 310-2 could be receiving a non-zero duty cycle signal 311-2, whereas power gating header transistors 310-3 through 310-6 could be fully ON. As will be further explained below, the combination of how many banks are ON, how many bank are OFF and the duty cycle of PWM signals 311-1 through 311-6 generally reflects the voltage of the power domain relative to a desired voltage.

Generally, embodiments in accordance with the present invention may operate to regulate from a higher voltage to a lower voltage. For example, consider that banks 310-1 though 310-6 are all ON, e.g., conducting. If local VDD 370 is greater than desired, the duty cycle of one of the PWM signal 311-1 is increased, decreasing the time that the corresponding bank, 310-1, of digital power-gating header transistors are conducting, such that less current is supplied to load 360, allowing local VDD 370 to decrease. If, after reaching 100% duty cycle (all power gating transistors 310-1 are off) for a bank, the local VDD 370 remains greater than desired, a next bank, e.g., 310-2 of power gating transistors is modulated via its PWM signal 311-2.

It is appreciated that regulating voltage from a higher voltage to a lower voltage is generally safer than regulating voltage from a lower voltage to a higher voltage. For example, digital circuits will generally operate at a relatively higher voltage, while they may fail at a relatively lower voltage, e.g., a voltage less than a regulated target voltage. It is to be appreciated however, that embodiments in accordance with the present invention are well suited to both "up" and "down" regulation, including movement in both directions.

Voltage regulator system 300 comprises a voltage sensor 320, for measuring the power domain local voltage 370. Voltage sensor 320 is physically within the power domain, e.g., in close proximity to circuitry receiving a voltage from voltage regulator system 300, e.g., load 360, in some embodiments. Voltage sensor 320 may receive a voltage offset calibration signal 321 from a global voltage controller, e.g., global voltage controller 240 as illustrated in FIG. 2, in some embodiments. Offset calibration may be needed because the voltage sensors should ideally give the same digital output for the same sensed voltage, but due to manufacturing variations may end up giving slightly different outputs for the same voltage. Hence an offset calibration may be introduced to nullify the manufacturing-variation induced offset.

Voltage sensor 320 measures the local VDD 370, and outputs a sensed voltage Vsense 325 to voltage comparator 330. Signal 325 may be a "thermometer code," in some embodiments. As is known, a thermometer code represents a number as a series of binary ones or zeros. For example, "n" may be represented by a sequence of n consecutive ones, followed by a zero. Encoder 327 converts the serial output of voltage sensor 320 into a parallel signal, in this exemplary embodiment, of five bits, representing voltage.

Voltage sensor 320 may comprise a time to digital converter (TDC), in some embodiments. Voltage comparator 330 compares sensed voltage Vsense 325 to a voltage request 326. Voltage request 326 is supplied from outside of voltage regulator system 300 and outside of the power domain, in some embodiments. For example, voltage request 326 may be provided by a global controller, e.g., global voltage controller 240 as illustrated in FIG. 2, that determines a desirable operating voltage for the power domain.

The comparison output of voltage comparator 330 feeds proportional, integral and derivative (PID) controller 340. Embodiments in accordance with the present invention are well suited to other types of controllers, including, for example, proportional and integral controllers, bang-bang controllers, and compensation controllers. The proportional term provides a single stage fast path to the second plurality of digital power-gating header transistors 310. The integral term reduces a proportional offset and responds to mid-frequency offsets. Responsive to the output of voltage comparator 330, proportional, integral and derivative (PID) controller 340 produces a pulse width value used to generate a variable width pulse for each of the power gating header transistor banks, e.g., produced by pulse width modulation generator (PWM) 350.

The output of proportional, integral and derivative (PID) controller 340 drives pulse width modulation generator (PWM) 350. Pulse width modulator generator 350 generates a pulse width modulated signal with a duty cycle according to the output of proportional, integral and derivative (PID) controller 340 for each bank of power-gating header transistors 310-1 to 310-6. It is appreciated that, in general, only one bank of power-gating header transistors 310-1 to 310-6 is modulated at a time. The remaining banks are typically either fully off or fully on. For example, embodiments in accordance with the present invention seek to identify a bank of power-gating header transistors 310-1 to 310-6 that is able to adjust for load variation. Other banks may provide current for a "base" load, e.g., a majority of a load that is not varying over a short term.

Exemplary distributed digital low-dropout voltage micro regulator system 300 further comprises a rapid response control loop 380. Rapid response control loop 380 is configured to quickly respond to sudden load current transients. The rapid response control loop 380 taps off of the first stage of the time to digital converter (TDC) synchronizer and saves two clock cycles in responding to sudden transients. If there is a sudden, large change in load current, and the voltage sensed through voltage sensor 320, in the form of a thermometer code, is less than a pre-set threshold, LO_THRESH, all power gates in bank 310-7 are turned ON while the voltage value, Therm_code_pre_sync, is less than the pre-set threshold, LO_THRESH.

The comparison of voltage to the pre-set threshold, "Is therm_codepre_sync<LO_THRESH," is performed in the thermometer code domain itself through a sequence of bitwise AND and XNOR operations, and there is no need for an encoder. The bitwise operations mitigate any metastability risks.

It is to be appreciated that embodiments in accordance with the present invention are well-suited to determining and/or setting a desirable operating voltage for a power domain within the power domain. For example, a power domain, e.g., power domain 210-1 of FIG. 2, may produce voltage request and/or offset calibration signals internally to the power domain, in accordance with embodiments of the present invention.

Figure 4:
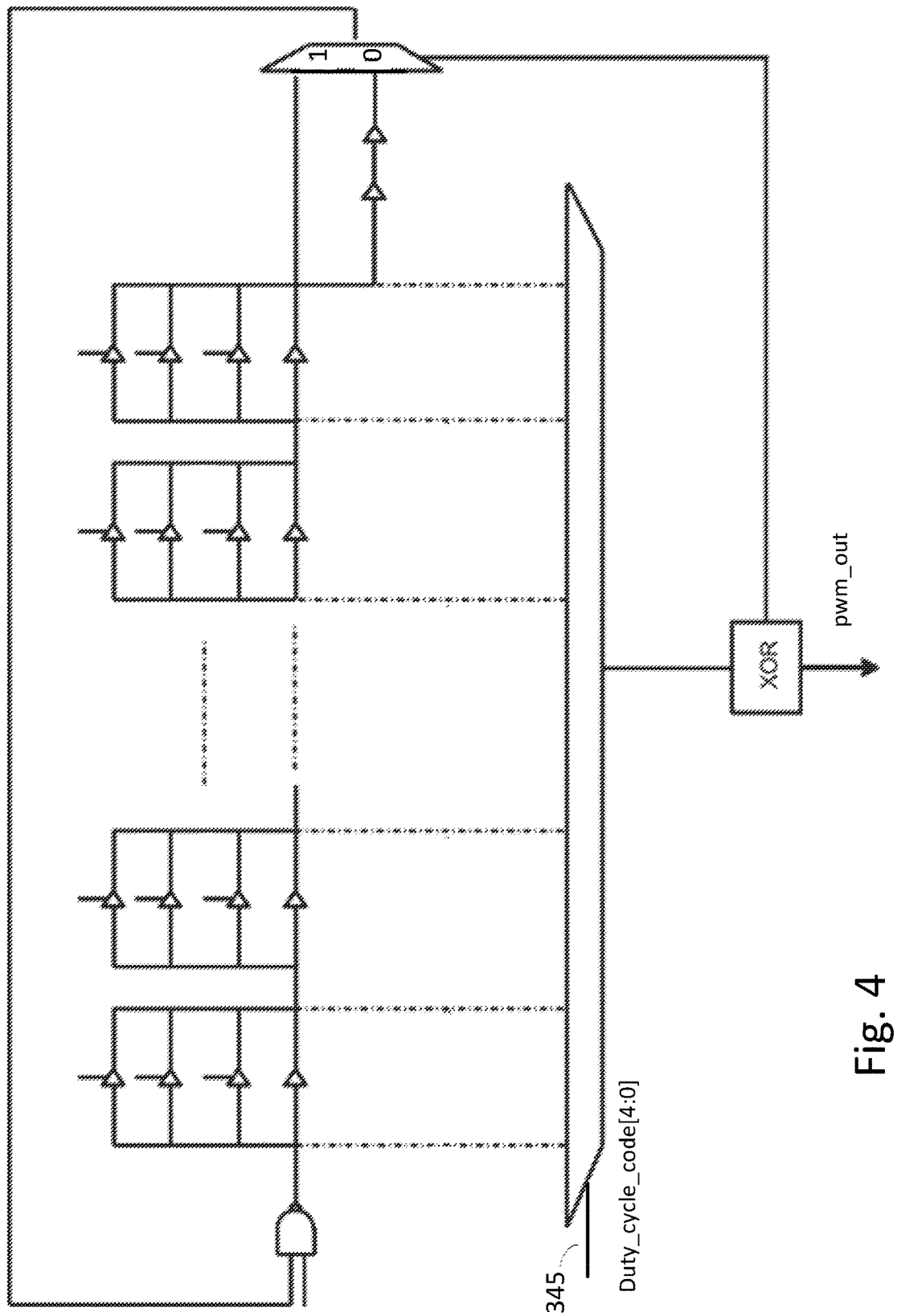
FIG. 4 illustrates a schematic for an exemplary pulse width modulation generator, in accordance with embodiments of the present invention.

FIG. 4 illustrates a schematic for an exemplary pulse width modulation generator 400, in accordance with embodiments of the present invention. Exemplary pulse width modulation generator 400 may correspond to pulse width modulation generator (PWM) 350 of FIG. 3. The pulse is generated through XORing a copy of the ring oscillator with its phase-delayed counterpart. The duty cycle for the design may range from 0%-90%, in some embodiments, which drives the gain stage connected to the power gates, e.g., the second plurality of digital power-gating header transistors 310, as illustrated in FIG. 3.

Figure 5:
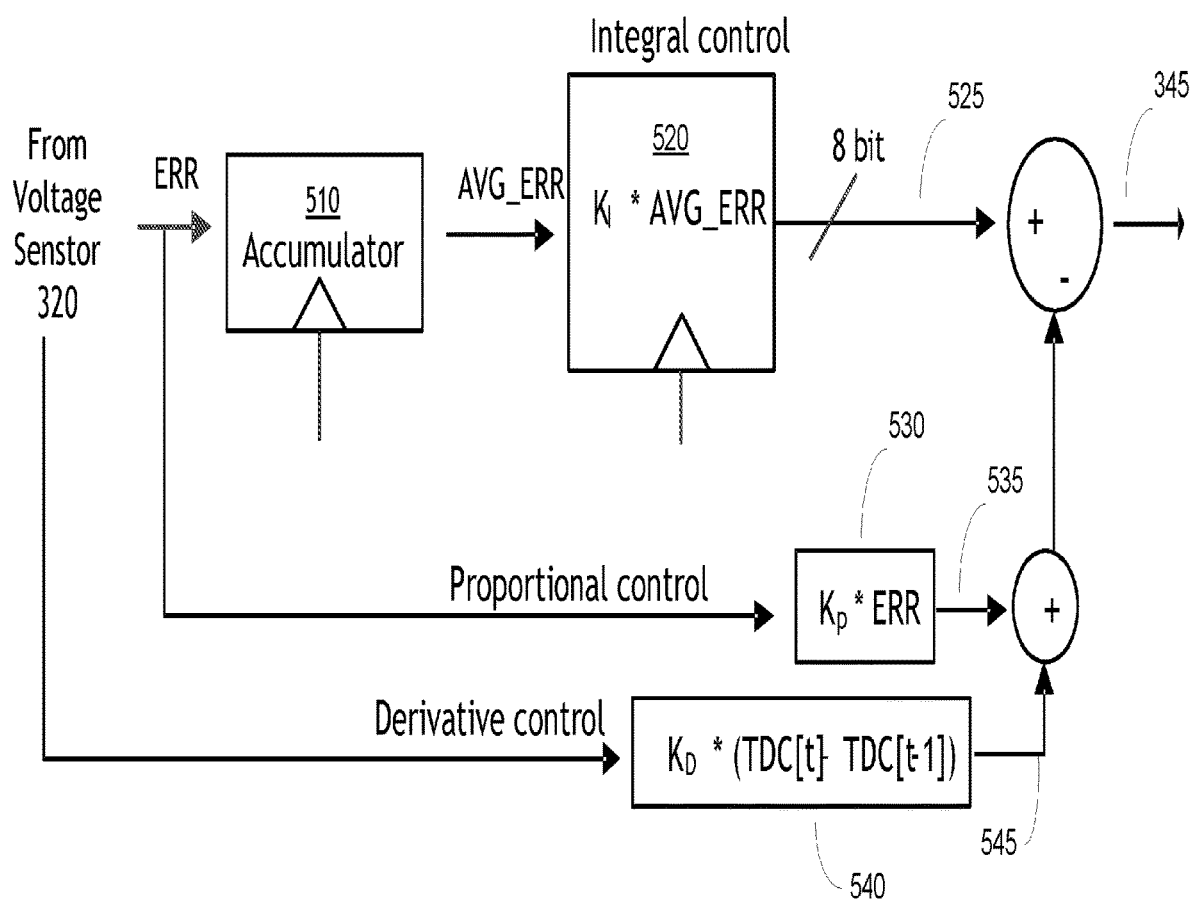
FIG. 5 illustrates a schematic for an exemplary proportional, integral and derivative (PID) controller, in accordance with embodiments of the present invention.

FIG. 5 illustrates a schematic for an exemplary proportional, integral and derivative (PID) controller 500, in accordance with embodiments of the present invention. Exemplary proportional and integral (PI) controller 500 may correspond to proportional, integral and derivative (PID) controller 340 of FIG. 3. Integral controller 520 accounts for past errors between local VDD 370 and the target voltage, and integrates them over time, multiplied by a Kr gain factor, to produce a correction factor 525. Proportional controller 530 multiplies the current error by a gain factor Kp to produce a correction factor 535. Derivative controller 540 combines the current error and the immediately preceding error and multiplies by a gain factor KD to produce a correction factor 545. The correction factors 525, 535 and 545 are added together to produce duty cycle code 345 as illustrated in FIG. 3.

Figure 6:
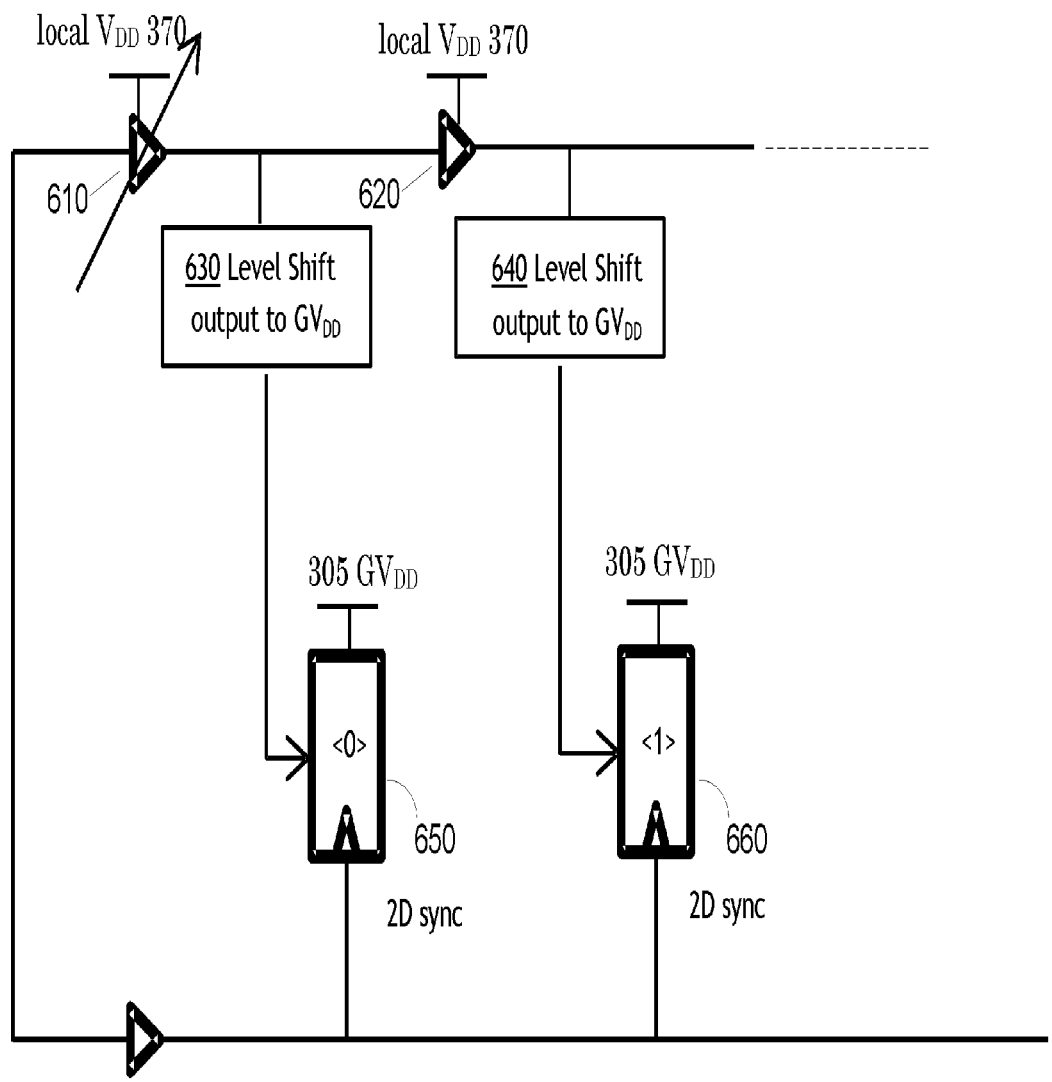
FIG. 6 illustrates a schematic for a portion of an exemplary time to digital converter (TDC), in accordance with embodiments of the present invention.

FIG. 6 illustrates a schematic for a portion of an exemplary time to digital converter (TDC) 600, in accordance with embodiments of the present invention. Exemplary time to digital converter (TDC) 600 may correspond to voltage sensor 320 of FIG. 3.

Exemplary time to digital converter (TDC) 600 comprises a plurality of delay elements 610, 620 . . . on the regulated local VDD 370. Only two stages of TDC 600 are illustrated. There would typically be many more such stages, e.g., 32 stages. The delay buffer output is shifted to the higher supply GVDD by level shifters 630, 640 . . . before latching the output using synchronizers 650, 660 . . . . This is done so that the synchronizers are less prone to metastability which would be the case if they were on a lower voltage supply, e.g., the lower voltage of local VDD 370.

Figure 7:
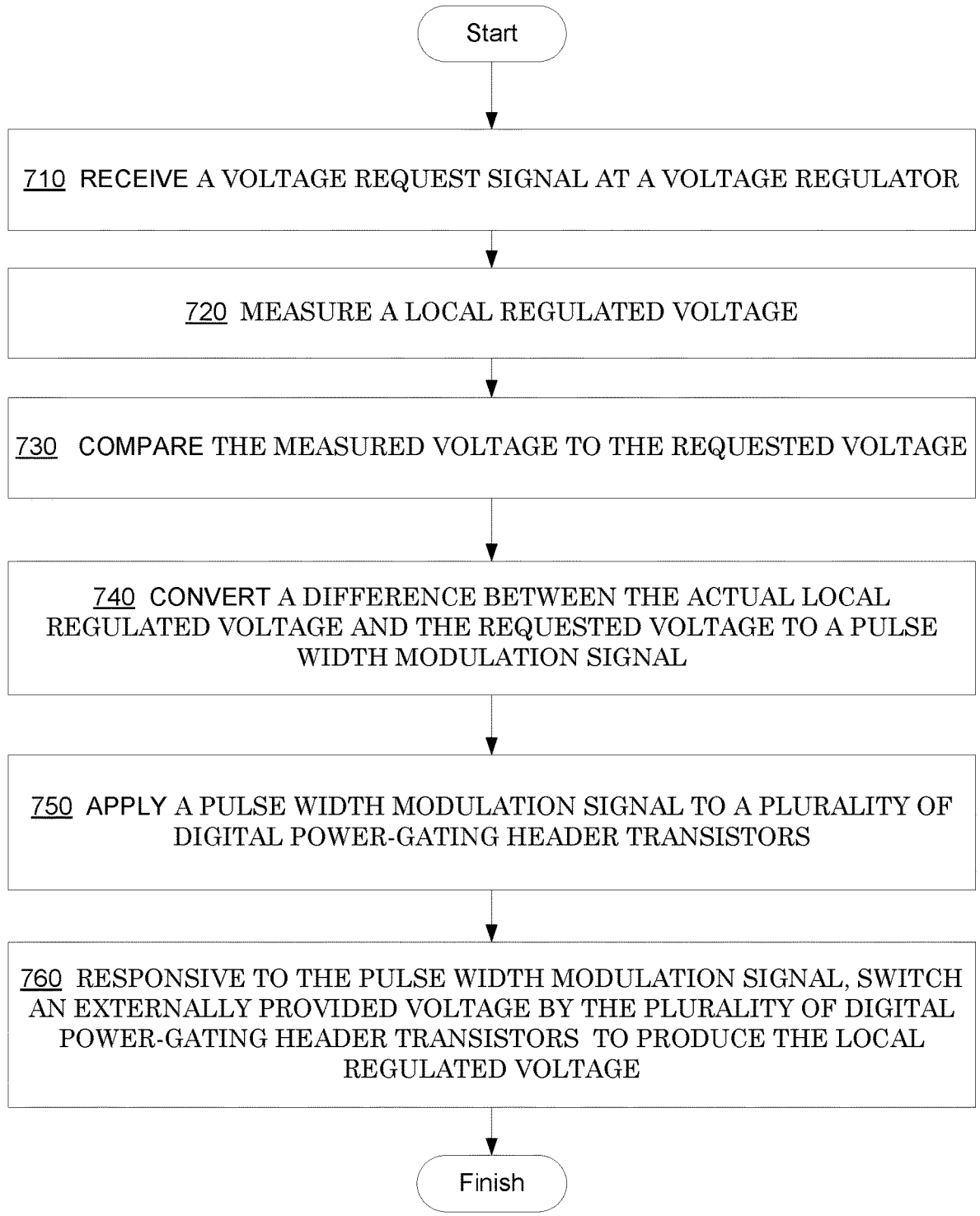
FIG. 7 illustrates an exemplary method, in accordance with embodiments of the present invention.

FIG. 7 illustrates an exemplary method 700, in accordance with embodiments of the present invention. At 710, a voltage request signal is received at a voltage regulator, e.g., exemplary digital micro low-dropout voltage regulator system 300 of FIG. 3. The voltage request signal, e.g., voltage request 326 of FIG. 3, informs the voltage regulator of a desired regulation voltage.

At 720, the voltage regulator measures a local regulated voltage, e.g., local VDD 370 (FIG. 3), at a load, e.g., at Iload 360 (FIG. 3). The local voltage may be measured by a voltage sensor, e.g., voltage sensor 320 (FIG. 3).

At 730, the measured voltage is compared to the requested voltage, e.g., by comparator 330 (FIG. 3). The comparison may be performed in the digital domain, in accordance with embodiments of the present invention. At 740, a difference between the actual local regulated voltage and the requested voltage is converted to a pulse width modulation signal, for example, by proportional and integral controller 340 and pulse width modulation generator (PWM) 350 (FIG. 3).

At 750, a pulse width modulation signal, e.g., from pulse width modulation generator (PWM) 350 (FIG. 3) is applied to a plurality of digital power-gating header transistors, e.g., second plurality of digital power-gating header transistors 310 (FIG. 3). At 760, responsive to the pulse width modulation signal, the plurality of digital power-gating header transistors switch an externally provided voltage, e.g., global voltage GVdd 305 (FIG. 3), to produce the local regulated voltage.

In accordance with embodiments of the present invention, the power-gating header transistors are digitally-controlled devices. All active devices, e.g., FETs, of the voltage regulator may be operated in a digital domain. All signals of the voltage regulator, except the externally provided voltage and the local voltage, may be characterized as digital signals.

In this novel manner, an operating voltage is regulated within a power domain, reducing deleterious distribution losses and advantageously increasing regulation response. The voltage is measured and controlled within the power domain, reducing errors due to separation of load and voltage sensing. Beneficially, the switches and the method of control are digital, and utilize digital components, enabling interleaving of power supply components near and among their loads. An additional advantage of using digital devices is decreased effects of process variation, in comparison to analog devices. An additional advantage is that since the entire circuit may utilize "digital" cells, the circuit design can take advantage of CAD synthesis and layout tools to automate the entire design execution process. No custom or analog layout is needed.

Embodiments in accordance with the present invention provide systems and methods for digital low-dropout micro regulators. In addition, embodiments in accordance with the present invention provide systems and methods for distributed digital low-dropout micro regulators that utilize digital power-gating header transistors. Further, embodiments in accordance with the present invention provide systems and methods for distributed digital low-dropout micro regulators that measure a regulated voltage at its load. Still further, embodiments in accordance with the present invention provide systems and methods for distributed digital low-dropout micro regulators that are compatible and complementary with existing systems and methods of design and manufacture for complex digital integrated circuits.

Various embodiments of the invention are thus described. While the present invention has been described in particular embodiments, it should be appreciated that the invention should not be construed as limited by such embodiments, but rather construed according to the below claims.

What is claimed is:

1. An integrated circuit comprising:
   a voltage regulator for accepting a first voltage and producing a regulated voltage,
   wherein all active devices of said voltage regulator are not analog field-effect transistor (FET) devices,
   the voltage regulator including:
   a pulse width modulation (PWM) generator that generates a digital PWM signal, and
   a plurality of digitally controlled power-gating header transistors, wherein the digital PWM signal is applied to at least two digitally controlled power-gating header transistors of the plurality of digitally controlled power-gating header transistors.

2. The integrated circuit of claim 1 wherein all signals of said voltage regulator, except said first voltage and said regulated voltage, are characterized as digital signals.

3. The integrated circuit of claim 1 wherein said plurality of digitally controlled power-gating header transistors switch said first voltage to produce said regulated voltage.

4. The integrated circuit of claim 1 wherein some active devices of said voltage regulator are physically separated from other active devices of said voltage regulator by active devices of non-voltage regulator circuitry.

5. The integrated circuit of claim 1 wherein said regulated voltage is configured to power a power domain, and said voltage regulator is physically within said power domain.

6. The integrated circuit of claim 1 wherein the digital PWM signal is distributed to each power gate of each digitally controlled power-gating header transistor included in the at least two digitally controlled power-gating header transistors.

7. The integrated circuit of claim 6 wherein distributing the digital PWM signal to each power gate results in a phase shift in the digital PWM signal received across the digitally controlled power-gating header transistors included in the at least two digitally controlled power-gating header transistors.

8. The integrated circuit of claim 7 wherein the phase shift avoids a simultaneous state change of the at least two digitally controlled power-gating header transistors.

9. The integrated circuit of claim 1 wherein the at least two digitally controlled power-gating header transistors represents one of a plurality of banks of the plurality of digitally controlled power-gating header transistors that, in combination, produce the regulated voltage.

10. The integrated circuit of claim 9 wherein the plurality of banks are independently controlled.

11. The integrated circuit of claim 10, wherein the plurality of banks are independently controlled by independently generated digital PWM signals.

12. The integrated circuit of claim 11 wherein the independently generated digital PWM signals are configurable to enable different operation of the plurality of banks.

13. The integrated circuit of claim 12 wherein the operation includes being:
turned fully off,
turned fully on, or
modulated between being turned off and turned on.

14. The integrated circuit of claim 1 wherein the digital PWM signal applied to the at least two digitally controlled power-gating header transistors is a non-zero duty cycle signal.

15. The integrated circuit of claim 1 wherein the digital PWM signal applied to the at least two digitally controlled power-gating header transistors causes digitally controlled power-gating header transistors included in the at least two digitally controlled power-gating header transistors to modulate between being turned off and turned on.

16. An integrated circuit comprising:
a voltage regulator for accepting a first voltage and producing a regulated voltage,
wherein active devices of said voltage regulator comprise no analog field-effect transistor (FET) devices,
the voltage regulator including:
a pulse width modulation (PWM) generator that generates a digital PWM signal, and
a plurality of digitally controlled power-gating header transistors, wherein the digital PWM signal is applied to at least two digitally controlled power-gating header transistors of the plurality of digitally controlled power-gating header transistors.

* * * * *